(12) United States Patent
Viswanath et al.

(10) Patent No.: US 10,024,979 B1
(45) Date of Patent: Jul. 17, 2018

(54) PHOTON COUNTING WITH COINCIDENCE DETECTION

(71) Applicant: TEXAS INSTRUMENTS INCORPORATED, Dallas, TX (US)

(72) Inventors: Rakul Viswanath, Chennai (IN); Nagesh Surendranath, Bengaluru (IN); Ratna Kumar Venkata Parupudi, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/800,313

(22) Filed: Nov. 1, 2017

(51) Int. Cl.
*G01T 1/172* (2006.01)

(52) U.S. Cl.
CPC .................................. *G01T 1/172* (2013.01)

(58) Field of Classification Search
CPC ........... H04N 5/378; G01T 1/247; G01T 1/00; G01T 1/172
See application file for complete search history.

(56) References Cited

U.S. PATENT DOCUMENTS

| | | | |
|---|---|---|---|
| 4,070,578 A | 1/1978 | Timothy et al. |
| 4,255,659 A | 3/1981 | Kaufman et al. |
| 5,693,946 A | 12/1997 | Vickers et al. |
| 5,943,388 A | 8/1999 | Tumer |
| 6,300,635 B1 | 10/2001 | Brambilla et al. |
| 6,917,041 B2 | 7/2005 | Doty et al. |
| 6,998,913 B2 | 2/2006 | DeGeronimo |
| 7,065,175 B2 | 6/2006 | Green |
| 7,139,024 B2 | 11/2006 | Lu et al. |
| 7,157,715 B1 | 1/2007 | Craing, Jr. et al. |
| 7,157,716 B2 | 1/2007 | Kitaguchi et al. |
| 7,170,049 B2 | 1/2007 | Iwanczyk et al. |
| 7,233,979 B2 | 6/2007 | Dickerman et al. |
| 7,339,175 B1 | 3/2008 | Drummond et al. |
| 7,362,175 B2 | 4/2008 | Argues |
| 7,368,722 B2 | 5/2008 | Berthold et al. |
| 7,388,210 B2 | 6/2008 | Ouvrier-Buffet et al. |
| 7,514,688 B2 | 4/2009 | Boroennimann et al. |
| 7,582,878 B2 | 9/2009 | Shahar et al. |
| 7,592,603 B2 | 9/2009 | Hsi et al. |
| 7,615,753 B2 | 11/2009 | Audebert et al. |
| 7,634,061 B1 | 12/2009 | Turner et al. |

(Continued)

*Primary Examiner* — Marcus Taningco
(74) *Attorney, Agent, or Firm* — John R. Pessetto; Charles A. Brill; Frank D. Cimino

(57) ABSTRACT

A photon counting system includes a photon sensor and pixel circuitry. The pixel circuitry includes a charge sensitive amplifier (CSA), an analog to digital converter (ADC), an event detector, and a coincidence detector. The CSA is configured to convert photon energy detected by the photon sensor to a voltage pulse. The ADC is coupled to an output of the CSA. The ADC is configured to digitize the voltage pulses generated by the CSA. The event detector is configured to determine whether output voltage of the CSA exceeds an event threshold voltage, and to trigger the ADC to digitize the output voltage based on the output voltage exceeding the event threshold voltage. The coincidence detector is configured to determine whether the output voltage of the CSA exceeds a coincidence threshold voltage, and to trigger the ADC to digitize the output voltage based on the output voltage exceeding the coincidence threshold voltage.

20 Claims, 4 Drawing Sheets

(56) References Cited

U.S. PATENT DOCUMENTS

| | | |
|---|---|---|
| 7,738,631 B2 | 6/2010 | Rundle |
| 7,760,123 B2 | 7/2010 | Rao et al. |
| 7,818,047 B2 | 10/2010 | Tumer et al. |
| 7,868,665 B2 | 1/2011 | Turner et al. |
| 8,044,681 B2 | 10/2011 | Rao et al. |
| 8,159,286 B2 | 4/2012 | Rao et al. |
| 8,170,175 B2 | 5/2012 | Kasuya |
| 8,198,577 B2 | 6/2012 | Dierickx |
| 8,213,566 B2 | 7/2012 | Roessl et al. |
| 8,260,565 B2 | 9/2012 | DeGeronimo |
| 8,269,180 B2 | 9/2012 | DeGeronimo |
| 8,299,670 B2 | 10/2012 | Krumme |
| 8,373,135 B2 | 2/2013 | Kappler |
| 8,378,310 B2 | 2/2013 | Bornefalk et al. |
| 8,384,038 B2 | 2/2013 | Guo et al. |
| 8,415,635 B2 | 4/2013 | Marks et al. |
| 8,426,828 B2 | 4/2013 | Dierickx |
| 8,440,957 B2 | 5/2013 | Dierickx |
| 8,491,190 B2 | 7/2013 | Glasser et al. |
| 8,610,081 B2 | 12/2013 | Rao et al. |
| 8,618,495 B2 | 12/2013 | DeGeronimo |
| 8,680,474 B2 | 3/2014 | Soh et al. |
| 8,729,485 B2 | 5/2014 | Soh et al. |
| 8,748,832 B2 | 6/2014 | Brambilla et al. |
| 8,816,290 B2 | 8/2014 | Hamlin |
| 8,816,292 B2 | 8/2014 | Cui et al. |
| 8,866,094 B2 | 10/2014 | Tsukiyama et al. |
| 8,866,097 B2 | 10/2014 | Meng |
| 8,891,845 B2 | 11/2014 | Ogawa et al. |
| 9,014,455 B2 | 4/2015 | Oh et al. |
| 9,029,793 B2 | 5/2015 | Spartiotis et al. |
| 9,086,494 B2 | 7/2015 | Han et al. |
| 9,116,249 B1 | 8/2015 | Claus et al. |
| 9,121,955 B2 | 9/2015 | Schmitt et al. |
| 9,128,195 B2 | 9/2015 | Soh et al. |
| 9,185,314 B2 * | 11/2015 | Mantri .................. H04N 5/359 |
| 9,213,108 B2 | 12/2015 | Nagai |
| 9,254,113 B2 | 2/2016 | Kim et al. |
| 9,274,235 B2 | 3/2016 | Kang et al. |
| 9,310,495 B2 | 4/2016 | Spartiotis et al. |
| 9,301,378 B2 | 5/2016 | Steadman Booker et al. |
| 9,351,701 B2 | 5/2016 | Yamakawa et al. |
| 9,354,331 B2 | 5/2016 | Sagoh et al. |
| 9,417,339 B2 | 8/2016 | Spahn |
| 9,444,344 B2 | 9/2016 | Kim et al. |
| 9,517,045 B2 | 12/2016 | Kang et al. |
| 9,538,107 B2 | 1/2017 | Chappo |
| 9,588,238 B2 | 3/2017 | Kim et al. |
| 9,588,239 B2 | 3/2017 | Abraham et al. |
| 9,595,101 B2 | 3/2017 | Kato et al. |
| 9,599,730 B2 | 3/2017 | Spahn |
| 9,602,747 B2 | 3/2017 | Scott et al. |
| 9,664,797 B2 | 5/2017 | Roessl et al. |
| 9,664,798 B2 | 5/2017 | Kappler et al. |
| 9,678,220 B2 | 6/2017 | Herrmann |
| 9,700,268 B2 | 7/2017 | Kang et al. |
| 9,730,665 B2 | 8/2017 | Choi et al. |
| 9,736,398 B2 | 8/2017 | Kim et al. |
| 9,750,471 B2 | 9/2017 | Schirra et al. |
| 9,753,160 B2 | 9/2017 | Bellazzini |
| 9,759,822 B2 | 9/2017 | Daerr et al. |
| 9,806,552 B2 * | 10/2017 | Brannick ................ H02J 7/007 |
| 2017/0119325 A1 * | 5/2017 | Tamura ................ A61B 6/4241 |
| 2017/0160129 A1 * | 6/2017 | Viswanath ................ G01J 1/44 |
| 2018/0049707 A1 * | 2/2018 | Ishitsu ................ A61B 6/4241 |

\* cited by examiner

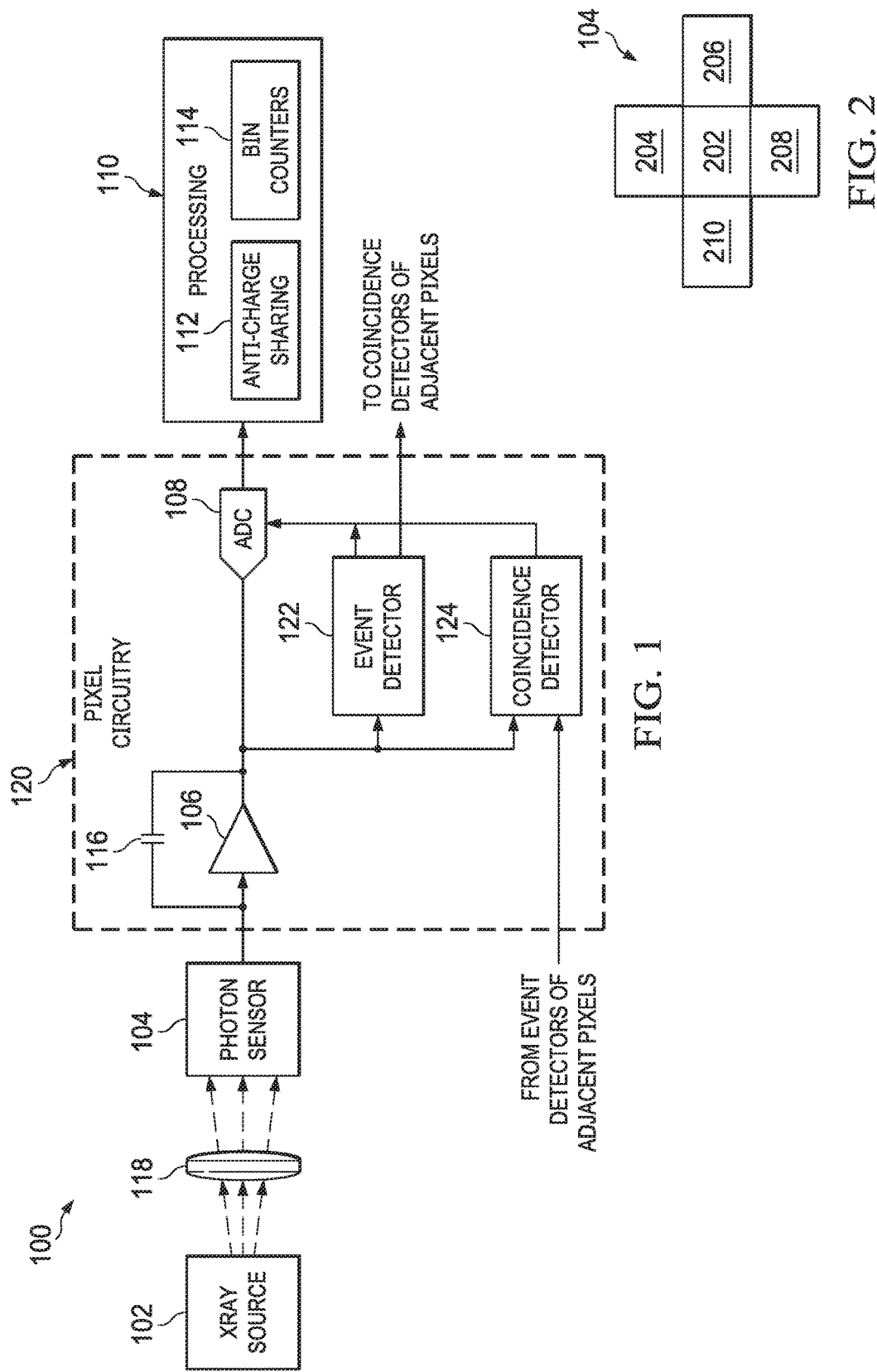

US 10,024,979 B1

PHOTON COUNTING WITH COINCIDENCE DETECTION

BACKGROUND

The penetrative ability of X-rays makes them valuable for structural imaging applications ranging from medical imaging and materials research to quality control and security. Transmission imaging with X-rays is typically used to produce an attenuation contrast image of the material of interest. However, these images suffer from poor contrast sensitivity that poses severe limitations in many applications. X-ray systems that employ photon counting detectors provide a number of advantages over older X-ray technologies that employ energy integrating detectors. For example, using a photon counting detector applying multiple detector energy thresholds, multiple contrast media can be simultaneously imaged and are distinguishable. Accordingly, X-ray systems using photon counting detectors show promise in a variety of innovative clinical applications.

SUMMARY

A photon counting system and photon detector for use therein are disclosed herein. In one embodiment, a photon counting system includes a photon sensor and pixel circuitry. The photon sensor comprising a plurality of photon detectors. The pixel circuitry is coupled to a first of the photon detectors. The pixel circuitry includes a charge sensitive amplifier (CSA), an analog to digital converter (ADC), an event detector, and a coincidence detector. The CSA is configured to convert photon energy detected by the photon sensor to a voltage pulse. The ADC is coupled to an output of the CSA. The ADC is configured to digitize the voltage pulses generated by the CSA. The event detector is coupled to the output of the CSA. The event detector is configured to determine whether output voltage of the CSA exceeds an event threshold voltage, and to trigger the ADC to digitize the output voltage based on the output voltage exceeding the event threshold voltage. The coincidence detector is coupled to the output of the CSA. The coincidence detector is configured to determine whether the output voltage of the CSA exceeds a coincidence threshold voltage, and to trigger the ADC to digitize the output voltage based on the output voltage exceeding the coincidence threshold voltage.

In another embodiment, a photon detection circuit includes a plurality of pixel circuits. Each of the pixel circuits includes a CSA, an ADC, an event detector, and a coincidence detector. The CSA is configured to convert photon energy detected by a photon sensor to a voltage pulse. The ADC is coupled to an output of the CSA. The ADC is configured to digitize the voltage pulse generated by the CSA. The event detector is configured to trigger the ADC to digitize the output voltage based on the output of the CSA exceeding a first reference voltage. The event detector includes a first comparator. The first comparator includes a first input coupled to the output of the CSA, and a second input connected to the first reference voltage. The coincidence detector is configured to trigger the ADC to digitize the output voltage. The coincidence detector includes a second comparator and logic circuitry. The second comparator includes a first input coupled to the output of the CSA, and a second input connected to a second reference voltage. The logic circuitry is coupled to the second comparator. For a given one of the pixel circuits the logic circuitry is configured to trigger the ADC to digitize the output voltage based on: the second comparator determining that output of the CSA exceeds the second reference voltage, and the event detector of a different one of the pixel circuits indicating that the output voltage of the CSA of the different one of the pixel circuits exceeds the first reference voltage.

In a further embodiment, a method for photon detection includes converting, in a first pixel circuit, photon energy incident on a first photon sensor to a first voltage pulse. The method also includes, in the first pixel circuit: comparing an amplitude of the first voltage pulse to an event threshold voltage, and triggering an ADC to digitize the first voltage pulse responsive to the comparing determining that the voltage pulse exceeds the event threshold voltage. The method further includes, in the first pixel circuit: comparing the amplitude of the first voltage pulse to a coincidence threshold voltage, and triggering the ADC to digitize the first voltage pulse responsive to the comparing determining that the voltage pulse exceeds the coincidence threshold voltage.

BRIEF DESCRIPTION OF THE DRAWINGS

For a detailed description of various examples, reference will now be made to the accompanying drawings in which:

FIG. 1 shows a block diagram of a photon counting X-ray system in accordance with various embodiments;

FIG. 2 shows adjacent pixels of a photon sensor used for coincidence detection in a photon counting X-ray system in accordance with various embodiments;

DETAILED DESCRIPTION

Figure 3:
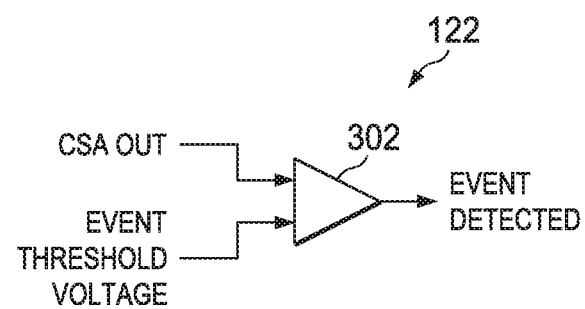
FIG. 3 shows a schematic diagram of an event detector suitable for use in a photon counting X-ray system in accordance with various embodiments.

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of additional factors. In the present disclosure, two pixels are adjacent to one another if the two pixels are abutting. Accordingly, for a given pixel, pixels that abut the given pixel are adjacent to the given pixel.

While photon counting systems provide a number of advantages over energy integrating systems, photon counting systems are subject to a variety of issues. For example, charge-sharing among multiple pixels of a photon detector due to electron cloud spread is a serious concern in photon counting systems. Countering charge-sharing with good accuracy using conventional techniques requires relatively higher power and/or an increase in circuit area. For example, conventional photon counting systems may include an analog circuit for each detector pixel that resolves charge sharing by analog summation of signals corresponding to a number of adjacent pixels. Such a solution requires complex circuitry that occupies a substantial area.

Embodiments of the photon counting system disclosed herein analyze charge sharing in the digital domain rather than the analog domain. To facilitate implementation of anti-charge sharing in the digital domain, embodiments apply multiple thresholds and share information with circuits corresponding to neighboring pixels to determine whether the signal associated with a given pixel of the photon detector is indicative of photon incidence and should be processed.

Embodiments compare pixel signal for a given pixel to a first threshold, and if the amplitude of the pixel signal exceeds the first threshold, then the pixel signal is digitized and processed as a photon detection. Embodiments also compare the pixel signal to a second threshold. The second threshold is lower than the first threshold, and if the pixel signal amplitude exceeds the second threshold, and signal amplitude for a pixel adjacent to the given pixel exceeds the first threshold, then the pixel signal is digitized and processed as a photon detection. This process ensures that signals having amplitudes lower than the first threshold are digitized so the energy can be included in anti-charge sharing computations. By requiring that at least one pixel of a group of adjacent pixels detect signal above the first threshold, embodiments are able to reduce the number of false detections while applying a lower threshold to coincidence detection that enable improved anti-charge sharing.

FIG. 1 shows a block diagram of a photon counting X-ray system 100 in accordance with various embodiments. The system 100 includes an X-ray source 102, a photon sensor 104, pixel circuitry 120, and processing circuitry 110. The pixel circuitry 120 includes a charge sensitive amplifier 106, an ADC 108, an event detector 122, and a coincidence detector 124. The X-ray source 102 is a clinical X-ray source, such as an X-ray tube suitable for clinical use (e.g., a clinical X-ray tube). The X-ray source 102 may emit monochromatic or polychromatic X-rays. The X-ray source 102 generates an X-ray beam that illuminates the object 118 to be imaged. While the object 118 is not part of the system 100, the object 118 is included in FIG. 1 to provide context.

The X-ray photons that pass through the object 118 are detected by the photon sensor 104. The photon sensor 104 is a pixelated device that senses incidence of photons on a face of the device. For example, the photon sensor 104 includes a two-dimensional array of photon detecting pixels (i.e. photon detectors). Each pixel of the sensor 104 is coupled to an instance of the pixel circuitry 120 and transfers charge induced by photon collisions to the pixel circuitry 120. The pixel circuitry 120 includes a charge sensitive amplifier 106 that accumulates charge transferred from the photon sensor 104 on a capacitor 116. That is, the charge sensitive amplifier 106 converts the charge provided by the photon sensor 104 to a voltage or voltage pulse representative of the energy of a photon incident on the pixel of the photon sensor 104 to which the charge sensitive amplifier 106 is coupled. The output of the charge sensitive amplifier 106 is coupled to the ADC 108, the event detector 122, and the coincidence detector 124.

The signal corresponding to the charge accumulated on the capacitor 116 (i.e., the output signal of the charge sensitive amplifier 106) is digitized by the ADC 108. The ADC 108 may be successive approximation ADC, a direct-conversion ADC, or other type of ADC. Operation of the ADC 108 (i.e., digitization of the output voltage of the charge sensitive amplifier 106) is triggered by operation of the event detector 122 and/or the coincidence detector 124.

The event detector 122 compares the output of the charge sensitive amplifier 106 to a reference voltage (i.e., an event threshold voltage). The event threshold voltage is set such that an output of the charge sensitive amplifier 106 exceeding the event threshold voltage is indicative of incidence of a photon on the photon sensor 104. If the output of the charge sensitive amplifier 122 exceeds the event threshold voltage, then the event detector 122 triggers the ADC 108 to digitize the output voltage of the charge sensitive amplifier 106.

The event threshold voltage may be set relatively high to avoid false detection. As a result, if photon charge is spread across multiple pixels, the charge provided by the photon sensor 104 to some instances of the pixel circuitry 120 may be too low to trigger digitization via the event detector 122. In such cases the total photon energy estimated by anti-charge sharing may be underestimated. To improve photon energy measurement, the pixel circuitry 120 includes the coincidence detector 124. The coincidence detector 124 compares the output of the charge sensitive amplifier 106 to a reference voltage (i.e., a coincidence threshold voltage). The coincidence threshold voltage may be substantially lower than the event threshold voltage to enable triggering of the ADC 108 based on a lower output voltage of the charge sensitive amplifier 106. The coincidence detector 124 is coupled to the pixel circuitry 120 corresponding to a number (e.g., four) of pixels adjacent to the pixel. For example, FIG. 2 shows five pixels of the photon sensor 102. If a given instance of the pixel circuitry 120 is connected to the pixel 202, then the coincidence detector 124 of the given instance of the pixel circuitry 120 is connected to receive event detection indications (e.g., output of an event detector 122) from the pixel circuitry 120 connected to each of pixels 204, 206, 208, and 210. Similarly, the pixel circuitry 120 connected to pixel 202 provides an event detection indication to each of the adjacent pixels 204, 206, 208, and 210. Some embodiments of the pixel circuitry 120 may connect the coincidence detector 124 to the pixel circuitry 120 connected to four or any other number of adjacent pixels.

The coincidence detector 124 conditions triggering of the ADC 108 on detection of output of the charge sensitive amplifier 106 above the coincidence threshold voltage, in conjunction with assertion of an event detection indication associated with an adjacent pixel. Accordingly, if the photon energy detected at any of the pixels 204, 206, 208, or 210 is sufficient to produce a charge sensitive amplifier output voltage that exceeds the event threshold voltage, and the photon energy detected at pixel 202 is sufficient to produce a charge sensitive amplifier output voltage that exceeds the coincidence threshold voltage (but does not exceed the event threshold voltage), then the coincidence detector 124 will trigger digitization of the charge sensitive amplifier output voltage that exceeds the coincidence threshold voltage.

The pixel circuitry 120 may include other components that are not shown in FIG. 1. For example, the pixel circuitry 120 may include circuitry to discharge the capacitor 116 in preparation for charge accumulation, circuitry to control the time over which charge is accumulated on the capacitor 116, and other circuits and components. While only a single instance of the pixel circuitry 120 is shown in FIG. 1, in practice, embodiments of the system 100 generally include as many instances of the pixel circuitry 120 as there are pixels in the photon sensor 104.

The processing circuitry 110 assigns each digital output value received from the ADC 108 to an energy bin. The processing circuitry 110 includes bin counters 114 and anti-charge sharing logic 112. Each bin corresponds to a different energy range of photons sensed by a pixel, and each bin counter 114 corresponds to a number of photons detected at a given pixel that are within the energy range corresponding to the bin. For example, for each pixel of the photon sensor 104, the bin counters 114 include a counter for each of a plurality of energy ranges. The anti-charge sharing logic 112 determines which of the bin counter 114 should be updated responsive to a digitized photon energy value received from the ADC 108 and the digitized photon energy values from neighboring pixels.

In some embodiments, the processing circuitry 110 may include a processor, such as a general-purpose microprocessor, a digital signal processor, a microcontroller, or other instruction execution device, and instructions executable by the processor to provide the anti-charge sharing logic 112 and update the bin counters 114. In some embodiments, the processing circuitry 110 may include hardware circuitry dedicated to the anti-charge sharing logic 112 and the bin counters 114.

FIG. 3 shows a schematic diagram of an event detector 122 suitable for use in a photon counting X-ray system 100 in accordance with various embodiments. The event detector 122 includes a comparator 302. One input of the comparator 302 is coupled to the output of the charge sensitive amplifier 106. The other input of the comparator 302 is coupled to a reference voltage source (e.g., a voltage reference circuit) that produces the event threshold voltage. When the output of the charge sensitive amplifier 106 exceeds the event threshold voltage, the comparator 302 asserts its output to trigger the ADC 108.

Figure 4:
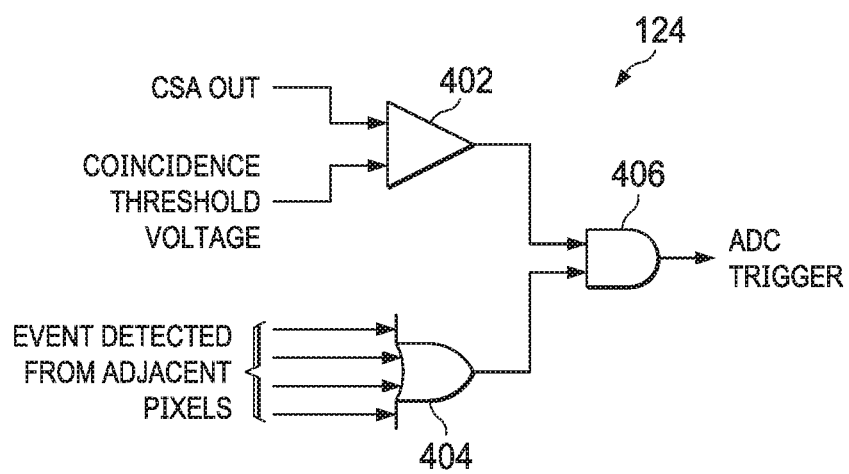
FIG. 4 shows a schematic diagram of a coincidence detector suitable for use in a photon counting X-ray system in accordance with various embodiments.

FIG. 4 shows a schematic diagram of a coincidence detector 124 suitable for use in a photon counting X-ray system 100 in accordance with various embodiments. The coincidence detector 124 includes a comparator 402 and logic circuits 404 and 406. While the logic circuits 404 and 406 are described herein as an "OR" gate and an "AND" gate respectively, various embodiments of the coincidence detector 124 may be implemented using different logic circuits that produce the results described herein.

One input of the comparator 402 is coupled to the output of the charge sensitive amplifier 106. The other input of the comparator 402 is coupled to a reference voltage source (e.g., a voltage reference circuit) that produces the coincidence threshold voltage. When the output of the charge sensitive amplifier 106 exceeds the coincidence threshold voltage, the comparator 302 asserts an output signal to the AND gate 406. The OR gate 404 receives as input event detected signals from pixel circuitry 120 associated with adjacent pixels. The output of the OR gate is asserted if any of the adjacent pixels detected photon energy producing a charge sensitive amplifier output voltage exceeding the event threshold voltage. When the output of the comparator 402 and the OR gate 404 are asserted, the AND gate produces a signal that triggers digitization of the charge sensitive amplifier output by the ADC 108.

Figures 5A, 5B, 5C, 5D:
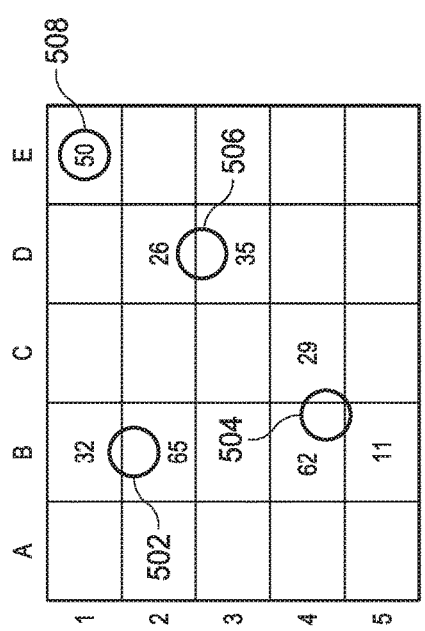
FIG. 5A shows photon energy detected by an array of pixels of a photon sensor.
FIG. 5B shows updating of the energy bins associated with the array of pixels responsive the detected photon energy without application of anti-charge sharing.
FIG. 5C shows updating of the energy bins associated with the array of pixels responsive the detected photon energy with application of anti-charge sharing in accordance with various embodiments.
FIG. 5D shows illustrative bin energy values and assignment of photons to bins based on cumulative energy in accordance with various embodiments.

Discrimination between photons of different energies is one application of photon counting detectors. Thus, energy bins corresponding to different energy levels are used to accumulate the number of photons detected at each energy level for each pixel. It is generally assumed that the charge generated by each photon is collected as a whole by the pixel on which the photon is incident. However, in practice this assumption is false, and the ratio of charge collected by a "pixel of incidence" to the total charge generated by the photon is a function of where the photon is incident and the size of the electron cloud generated by the photon. FIG. 5A shows photon energy incident on an array of pixels of the photon sensor 104. Photon incidence 502 straddles pixels B1 and B2, with energy 65 measured in B2 and energy 32 measured in B1. Photon incidence 504 straddles pixels B4, B5, and C4, with energy 62 measured in B4, energy 11 measured in B5, and energy 29 measured in C4. Photon incidence 506 straddles pixels D2 and D3, with energy 35 measured in D3 and energy 26 measured in D2. Photon incidence 508 is isolated to pixel E1 with energy 50.

FIG. 5B shows updating of the energy bins of the array of pixels responsive the photon energy without application of anti-charge sharing. The designations "Bin1," "Bin2," and "Bin3" identify pixel bins (e.g., bin counters 114) associated with different energy ranges. Responsive to photon incidence 502, Bin1 of pixel B1 and Bin3 of pixel B2 are incremented. Responsive to photon incidence 504, Bin3 of pixel B4 and Bin1 of pixel C4 are incremented. Responsive to photon incidence 506, Bin1 of pixel D2 and Bin2 of pixel D3 are incremented. Responsive to photon incidence 508, Bin2 of pixel E1 is incremented.

Thus, the energy bin updating of FIG. 6B fails to accurately reflect the incidence of photons of the proper energy at pixels for which the photon incidence overlaps multiple pixels. The anti-charge sharing logic 112 processes the output of the ADC 108 to determine which bins of the pixels in which charge is detected should be updated. The coincidence detector 124 allows the pixel circuitry 120 to detect lower photon energies without false triggering so that more energy can be included in a cumulative photon energy determination and the photon energies accurately binned. FIG. 5C shows updating of the energy bins of the array of pixels responsive to the photon energy with application of anti-charge sharing. In FIG. 5C, the majority of the energy from photon incidence 502 is associated with pixel B2, and Bin4 of pixel B2 is incremented by one based on the combined energies detected by pixels B1 and B2. For photon incidence 504, the majority of the energy is associated with pixel B4, and Bin5 of pixel B4 is incremented by one based on the combined energies detected by pixels B4, B5, and C4. For photon incidence 508, all of the energy is associated with pixel E1, and Bin2 of pixel E1 is incremented by one. For photon incidence 506, a higher amount of photon energy is associated with pixel D3, and Bin3 of pixel D3 is incremented by one based on the combined energies detected by pixels D2 and D3.

FIG. 5D shows illustrative energy ranges corresponding to each of six bins (e.g., bin counters 114), and assignment of the photons 502-508 to the various bins based on the cumulative energy value associated with each of the photons 502-508.

Figure 6:
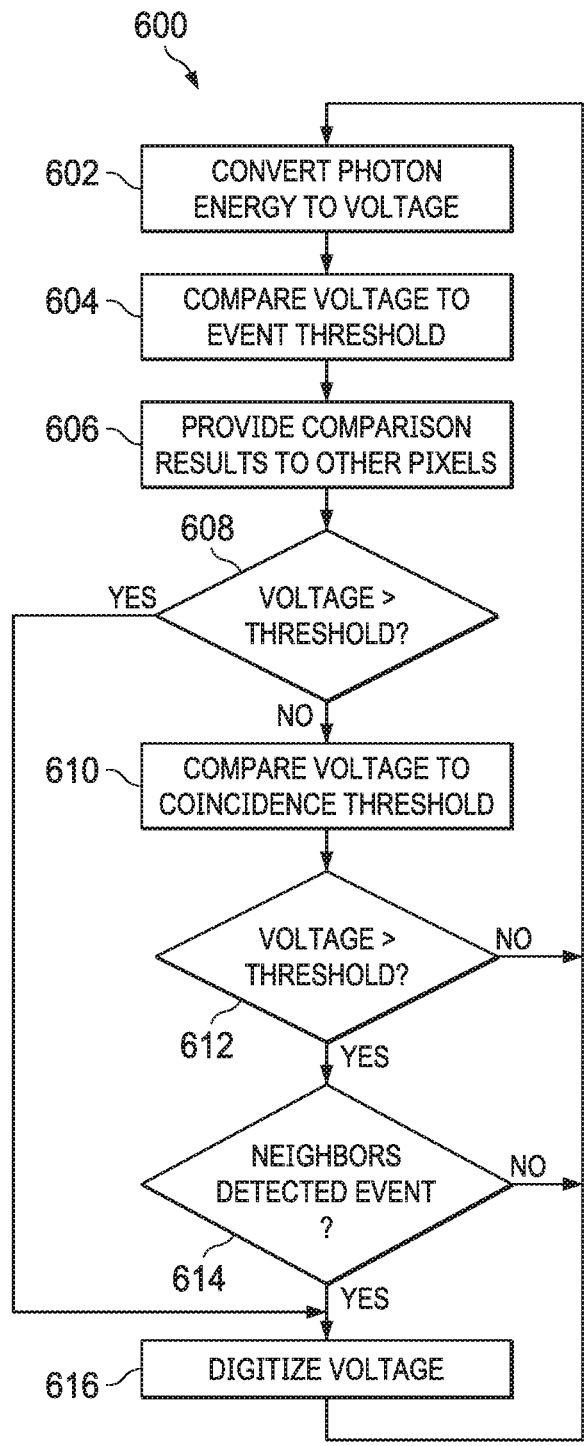
FIG. 6 shows a flow diagram for a method for photon detection in accordance with various embodiments.

FIG. 6 shows a flow diagram for a method 600 for photon detection in accordance with various embodiments. Though depicted sequentially as a matter of convenience, at least some of the actions shown can be performed in a different order and/or performed in parallel. Additionally, some embodiments may perform only some of the actions shown. In some embodiments, the operations of the method 600 can be performed by the circuitry of the photon counting X-ray system 100.

In block 602, the photon counting X-ray system 100 is operating. The X-ray source 102 is producing X-rays that pass through the object 118 and strike the photon sensor 104. The photon sensor 104 is detecting incidence of photons on the photon sensor 104, and charge generated by a given pixel of the photon sensor 104 is amplified and converted to a voltage signal (e.g., a voltage pulse) by the charge sensitive amplifier 106 of pixel circuitry 120 connected to the given pixel.

In block 604, the voltage output of the charge sensitive amplifier 106 is provided to the event detector 122. The event detector 122 compares the output of the charge sensitive amplifier 106 to an event threshold voltage. The event threshold voltage is a voltage level above which output of the charge sensitive amplifier 106 is deemed to represent incidence of a photon on the given pixel.

In block 606, the pixel circuitry 120 provides results of the comparison of block 604 to the pixel circuitry 120 associated with pixels adjacent to the given pixel. Thus, results of the event detection are shared across pixels.

In block 608, if the voltage output of the charge sensitive amplifier 106 exceeds the event threshold voltage, then the ADC 108 is triggered to digitize the voltage output of the charge sensitive amplifier 106 for the given pixel in block 616.

While the operations of blocks 610-614 are illustrated as being performed in sequence with blocks 604-608, as noted above operations may be performed in parallel, and in some embodiments the operations of blocks 610-614 may be performed in parallel with the operations of blocks 604-608.

In block 610, the voltage output of the charge sensitive amplifier 106 is provided to the coincidence detector 122. The coincidence detector 122 compares the output of the charge sensitive amplifier 106 to a coincidence threshold voltage. The coincidence threshold voltage is lower than the event threshold voltage. The coincidence threshold voltage is a voltage level above which the output of the charge sensitive amplifier 106 is deemed to represent charge sharing on the given pixel if the output of at least one charge sensitive amplifier 106 connected to an adjacent pixel exceeds the event threshold voltage.

In block 612, if the voltage output of the charge sensitive amplifier 106 exceeds the coincidence threshold voltage, then operation continues in block 614.

In block 614, if an event detector 122 coupled to a pixel adjacent to the given pixel (i.e., an event detector 122 assigned to a neighboring pixel) determined that the voltage output of the charge sensitive amplifier 106 connected to the neighboring pixel exceeds the event threshold voltage, then the ADC 108 is triggered to digitize the voltage output of the charge sensitive amplifier 106 for the given pixel in block 616.

The digitized voltage values generated by the ADC 108 in block 616 are provided to the processing circuitry 110. The processing circuitry 110 applies anti-charge sharing logic 112 to the digitized voltage values and updates the bin counters 114.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A photon counting system, comprising:
a photon sensor comprising a plurality of photon detectors; and
pixel circuitry coupled to a first of the photon detectors, the pixel circuitry comprising:
a charge sensitive amplifier (CSA) configured to convert photon energy detected by the photon sensor to a voltage pulse; and
an analog to digital converter (ADC) coupled to an output of the CSA, and configured to digitize the voltage pulses generated by the CSA;
an event detector coupled to the output of the CSA, and configured to:
determine whether output voltage of the CSA exceeds an event threshold voltage; and
trigger the ADC to digitize the output voltage based on the output voltage exceeding the event threshold voltage; and
a coincidence detector coupled to the output of the CSA, and configured to:
determine whether the output voltage of the CSA exceeds a coincidence threshold voltage; and
trigger the ADC to digitize the output voltage based on the output voltage exceeding the coincidence threshold voltage.

2. The photon counting system of claim 1, wherein the coincidence detector comprises a comparator, wherein a first input of the comparator is coupled the output of the CSA; and a second input of the comparator is coupled to a reference voltage circuit configured to generate a voltage corresponding to the coincidence threshold voltage.

3. The photon counting system of claim 1, wherein the coincidence detector is coupled to an event detector of pixel circuitry coupled to a second of the photon detectors; wherein the first of the photon detectors and the second of the photon detectors are adjacent to one another in the photon sensor.

4. The photon counting system of claim 3, wherein the coincidence detector is configured to trigger the ADC to digitize the output voltage based on the event detector of the pixel circuitry coupled to the second of the photon detectors determining that an output voltage of the CSA of the pixel circuitry coupled to the second of the photon detectors exceeds the event threshold voltage.

5. The photon counting system of claim 1, wherein the pixel circuitry is configured to provide a result of determining whether output voltage of the CSA exceeds the event threshold voltage to pixel circuitry coupled to a different one of the photon detectors.

6. The photon counting system of claim 1, wherein the coincidence detector is coupled to an event detector of pixel circuitry coupled to each of four photon detectors that are adjacent to the first of the photon detectors in the photon sensor.

7. The photon counting system of claim 6, wherein the coincidence detector is configured to trigger the ADC to digitize the output voltage based on the event detector of pixel circuitry coupled to any of the four photon detectors determining that an output voltage of the CSA exceeds the event threshold voltage.

8. The photon counting system of claim 7, wherein the event threshold voltage is higher than the coincidence threshold voltage.

9. A photon detection circuit, comprising:
a plurality of pixel circuits, each comprising:
  a charge sensitive amplifier (CSA) configured to convert photon energy detected by a photon sensor to a voltage pulse; and
  an analog-to-digital converter (ADC) coupled to an output of the CSA, and configured to digitize the voltage pulse generated by the CSA;
  an event detector configured to trigger the ADC to digitize the output voltage based on the output of the CSA exceeding a first reference voltage, the event detector comprising:
    a first comparator comprising:
      a first input coupled to the output of the CSA; and
      a second input connected to the first reference voltage;
  a coincidence detector configured to trigger the ADC to digitize the output voltage, the coincidence detector comprising:
    a second comparator comprising:
      a first input coupled to the output of the CSA; and
      a second input connected to a second reference voltage; and
    logic circuitry coupled to the second comparator, wherein for a given one of the pixel circuits the logic circuitry is configured to trigger the ADC to digitize the output voltage based on:
      the second comparator determining that output of the CSA exceeds the second reference voltage; and
      the event detector of a different one of the pixel circuits indicating that the output voltage of the CSA of the different one of the pixel circuits exceeds the first reference voltage.

10. The photon detection circuit of claim 9, wherein the given one of the pixel circuits and the different one of the pixel circuits are configured to process signals received from adjacent pixels of a photon sensor.

11. The photon detector circuit of claim 9, wherein the logic circuitry of the given one of the pixel circuits is coupled to the event detector of each of four different pixel circuits.

12. The photon detector of claim 11, wherein each of the four different pixel circuits is configured to process signals from a pixel adjacent to the pixel processed by the given one of the pixel circuits.

13. The photon detector circuit of claim 11, wherein for the given one of the pixel circuits the logic circuitry is configured to trigger the ADC to digitize the output voltage based on:
  the second comparator determining that output of the CSA exceeds the second reference voltage; and
  the event detector of any of the four different pixel circuits indicating that the output voltage of the CSA of any of the four different pixel circuits exceeds the first reference voltage.

14. The photon detector of claim 9, wherein the first reference voltage is higher than the second reference voltage.

15. The photon detector of claim 9, wherein the given one of the pixel circuits is configured to provide an output of the first comparator to the coincidence detector of the different one of the pixel circuits.

16. A method for photon detection, comprising:
in a first pixel circuit:
  converting photon energy incident on a first photon detector to a first voltage pulse;
  comparing an amplitude of the first voltage pulse to an event threshold voltage;
  triggering an analog-to-digital converter (ADC) to digitize the first voltage pulse responsive to the comparing determining that the voltage pulse exceeds the event threshold voltage;
  comparing the amplitude of the first voltage pulse to a coincidence threshold voltage;
  triggering the ADC to digitize the first voltage pulse responsive to the comparing determining that the voltage pulse exceeds the coincidence threshold voltage.

17. The method of claim 16, further comprising:
in the first pixel circuit:
  receiving, from a second pixel circuit, an indication that an amplitude of a second voltage pulse resulting from photon energy incident on a second photon detector exceeds the event threshold voltage;
  triggering the ADC to digitize the first voltage pulse responsive to the indication.

18. The method of claim 17, wherein the second photon detector is adjacent to the first photon detector.

19. The method of claim 16, wherein the event threshold voltage is higher than the coincidence threshold voltage.

20. The method of claim 16, further comprising providing, to a second pixel circuit that is connected to photon detector adjacent to the first photon detector, a result of comparing the amplitude of the first voltage pulse to the event threshold voltage.

* * * * *